No. 616,578. Patented Dec. 27, 1898.
W. LOVE.
PIPE COUPLING.
(Application filed Mar. 12, 1898.)
(No Model.)

Witnesses
F. B. Hallock.
R. M. Pierce

Inventor
William Love.
by Geo. C. Hazelton Jr.
Attorney.

THE NORRIS PETERS CO., PHOTO-LITHO., WASHINGTON, D. C.

UNITED STATES PATENT OFFICE.

WILLIAM LOVE, OF BRYN MAWR, PENNSYLVANIA.

PIPE-COUPLING.

SPECIFICATION forming part of Letters Patent No. 616,578, dated December 27, 1898.

Application filed March 12, 1898. Serial No. 673,595. (No model.)

*To all whom it may concern:*

Be it known that I, WILLIAM LOVE, a citizen of the United States, residing at Bryn Mawr, in the county of Montgomery and State of Pennsylvania, have invented a certain new and useful Improvement in Pipe-Couplings, of which the following is a specification.

My invention relates to a new and useful improvement in pipe-couplings, and has for its object to provide a simple, cheap, and effective device of this description for securing the meeting ends of a pipe in line after the manner of a union-joint, and this without the necessity of threading said pipe or the removal of the same from its fastenings should a break occur therein.

The further object of my invention is to provide for the insertion of a T-joint by simply cutting the pipe in two and placing my improvement upon the ends thereof.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—.

Figure 1:
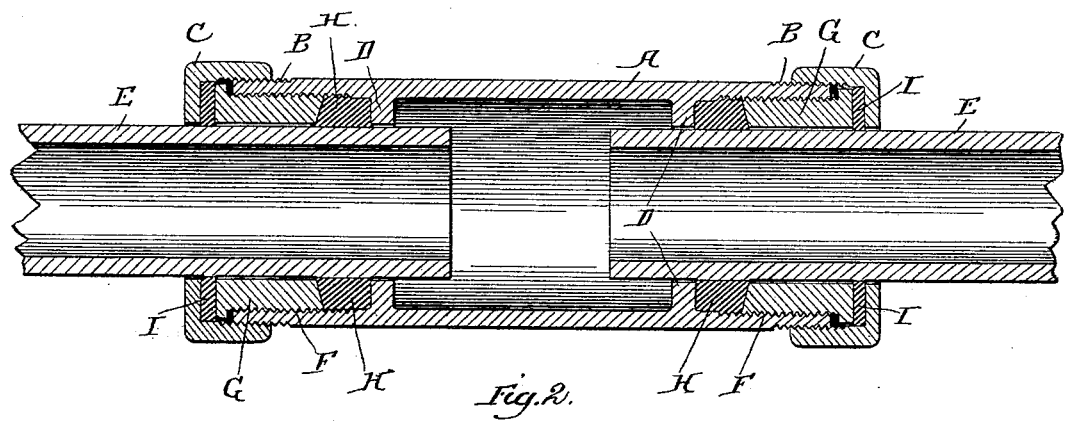
Figure 2:
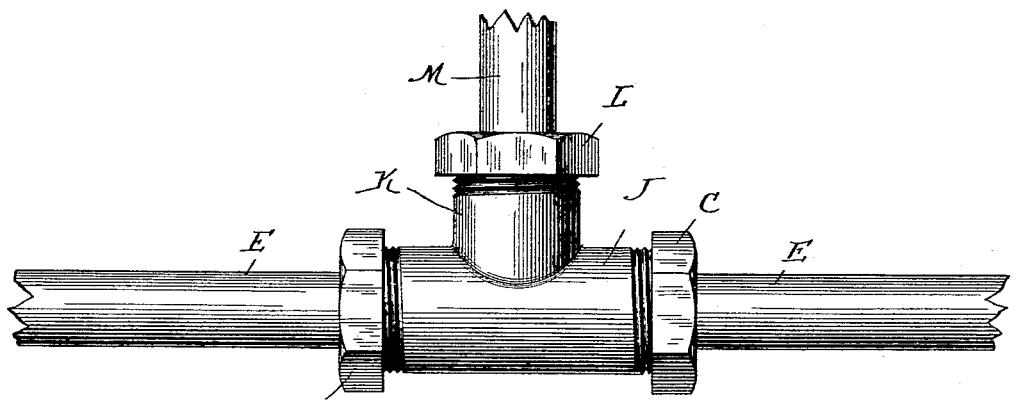

Figure 1 is an enlarged longitudinal section of my improvement, showing it in place upon the ends of two sections of pipe, coupling the same together; Fig. 2, an elevation showing a T-coupling in place connecting a branch line with a main line of pipe, and Fig. 3 a similar view showing a faucet or valve carried by the coupling.

Carrying out my invention as here embodied, A represents the body of the coupling, which is cylindrical in form, the ends thereof being threaded externally, as indicated at B, for the reception of the caps C, and these caps are formed after the manner of nuts for the application of a wrench, whereby they may be run upon the threaded ends of the body A and adjusted thereon for the purpose hereinafter set forth.

Flanges D are formed within the body, and the openings therethrough are of sufficient diameter to permit the free passage of the ends of the pipes E. The ends of the cylinder are threaded internally, as indicated at F, for the reception of the stuffing-plugs G, so that when the ends of the pipes are in position suitable packing material H may be placed without the ends of the body, so as to bear against the flanges D, thus making these ends serve as glands, and when the plugs G are secured therein this packing material will be forced against the pipes, and thereby prevent any leakage taking place at these points. After the plugs have been properly adjusted, so that no leakage takes place, a washer I is placed against the end of said plugs and the caps C secured thereagainst, as clearly shown in Fig. 1, and this will further serve to prevent leakage from the coupling.

In the application of my improvement to a pipe which has been injured it is only necessary to sever the pipe and pass the coupling first upon one end and then the other and finally adjust the same, as above described; but if at any time it be discovered that a leakage is taking place from the coupling either or both of the caps may be unscrewed and the plugs further tightened to force the packing H against the pipe, and, as is obvious, this may be accomplished without shutting off the pressure within the pipe.

One of the principal advantages of my improvement is the fact that a fractured pipe may be quickly repaired with but little skill upon the part of the operator and with comparatively few tools, thus rendering my improvement especially adapted for use in isolated sections and where it is necessary to repair an injury at once and with as little loss of time as possible.

In Fig. 2 I have shown the manner of using my improvement as a T-coupling, in which case the body J is similar in all respects to that described in Fig. 1, except that the branchway K leads therefrom and is also fitted with the stuffing-gland and cap L for attaching the pipe M thereto.

Figure 3:
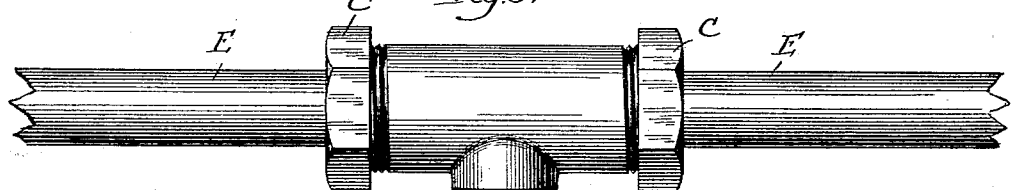

Likewise it is seen that in Fig. 3 the valve or faucet N may be coupled to the T-joint, so that at any time said valve or faucet may be inserted within a line of pipe by simply severing one section thereof and adjusting the coupling thereto.

Of course I do not wish to be limited to the exact details of construction here shown and described, as these may be varied within certain limits without departing from the spirit of my invention.

Having thus fully described my invention, what I claim as new and useful is—

1. In combination, a cylindrical body, flanges formed therein by the openings therethrough of sufficient size to receive the ends of the pipes; stuffing-plugs threaded within the ends of the pipes, suitable packing H interposed between the flanges and the ends of the plugs caps adapted to be run upon the ends of the body, and washers interposed between the outer ends of the plugs and the caps as specified.

2. A pipe-coupling consisting of a cylindrical body, flanges formed within said body; threads formed within the interior of the ends of the body; stuffing-plugs adapted to engage with said threads, packing material H interposed between the flanges and the plugs; washers fitted upon the outer ends of the plugs; caps run upon the ends of the body for compressing said washers, and a pipe fitted within each end of the coupling, as and for the purpose set forth.

In testimony whereof I have hereunto affixed my signature in the presence of two subscribing witnesses.

WILLIAM LOVE.

Witnesses:
S. S. WILLIAMSON,
R. M. PIERCE.